Patented Sept. 4, 1945

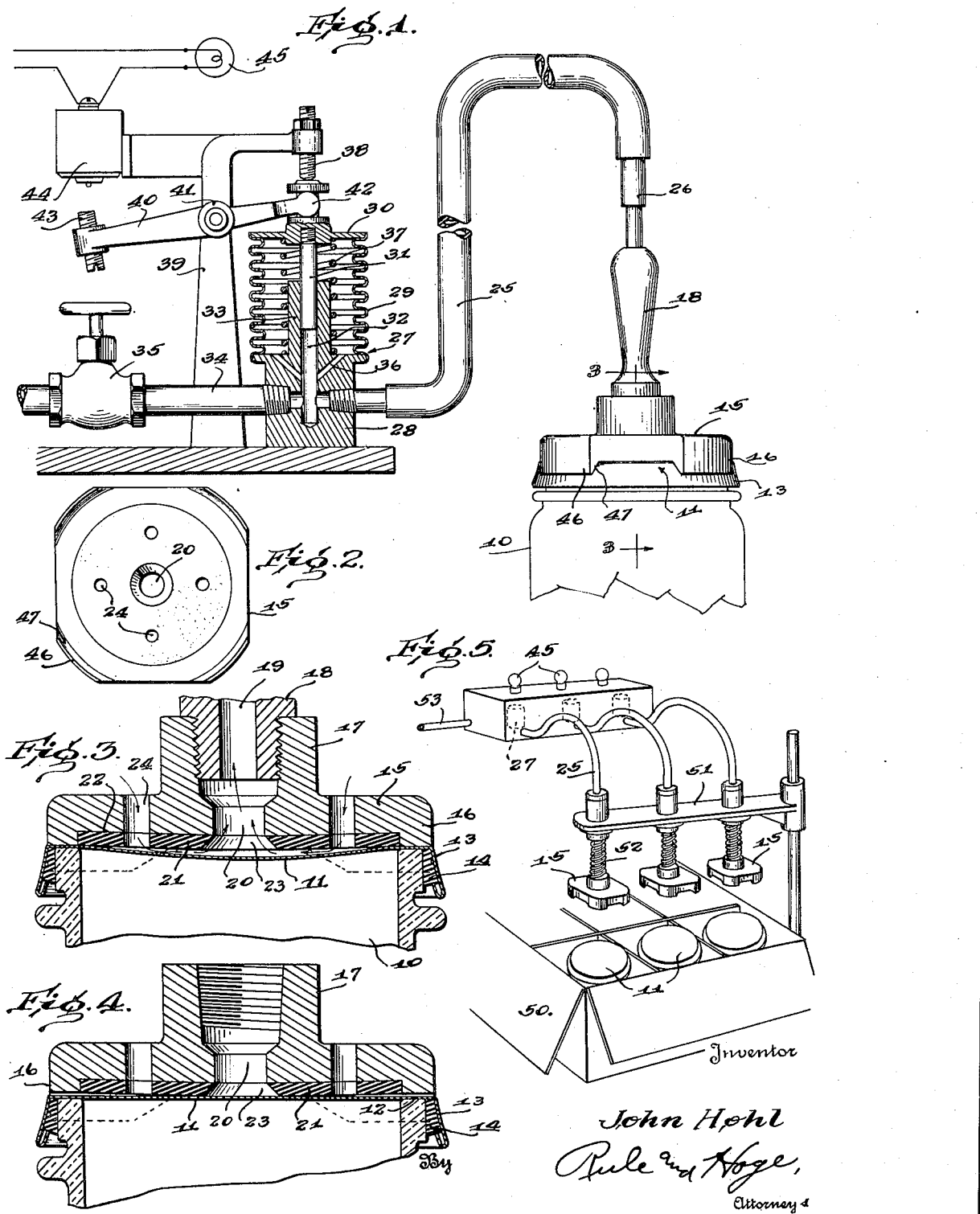

2,383,936

UNITED STATES PATENT OFFICE 2,383,936

VACUUM TESTING APPARATUS

John Hohl, Toledo, Ohio, assignor to Owens-Illinois Glass Company, a corporation of Ohio Application January 13, 1943, Serial No. 472,292

9 Claims. (Cl. 73—40)

My invention relates to apparatus for determining pressure conditions within confined spaces, and in the form herein illustrated is particularly adapted for testing jars or other containers which have been sealed with a partial vacuum therein, to detect those in which the vacuum is too low or has been lost owing to leakage and which are known in the trade as "duds." Many food products and other materials are at the present day, extensively packed in jars or containers which are vacuumized before sealing, or sealed under conditions which produce a partial vacuum therein. It is necessary to maintain an airtight seal to prevent deterioration or spoilage of the contents of the container.

Methods in general use at the present day for detecting "duds" are unreliable. An object of my invention is to provide an apparatus which is efficient and reliable in operation for detecting those containers in which the vacuum has been dissipated or is below a prescribed limit.

Other objects of the invention will appear hereinafter.

Referring to the accompanying drawing:

Fig. 1 is a part-sectional elevation of an apparatus embodying the present invention.

Fig. 2 is a bottom plan view of a testing head.

Fig. 3 is a fragmentary sectional view of the testing head applied to a vacuumized jar.

Fig. 4 is a similar view with the testing head applied to a jar in which the vacuum has been lost.

Fig. 5 is a perspective view of a modification adapted for simultaneously testing a plurality of jars packed in a carton.

The apparatus as illustrated is designed to test a sealed container 10, herein shown as a glass jar. A closure device or cap 11 which may be made of sheet metal, seats on the top surface 12 or rim of the jar and is formed with a depending skirt or flange 13. A ring gasket 14 of rubber or the like forms a hermetic seal between the cap and jar.

When the jar is vacuumized and sealed, the atmospheric pressure forces the central portion of the flexible cap downward below the level of the rim as shown in Fig. 3. The extent of this depression or deformation is determined by the degree of vacuum within the container.

The testing apparatus comprises a testing head 15 approximately in the form of a disk having a depending annular flange portion 16 adapted to seat on the peripheral portion of the cap 11, directly over the rim 12 of the jar. The head 15 is formed with a central tubular extension or hub 17 which is internally threaded to receive the threaded end of a handle 18. The latter is formed with a bore or opening 19 which extends lengthwise therethrough to a central opening 20 extending through the head 15. A sealing disk 21 of rubber or like material is cemented or otherwise attached to the lower face of the head, being fitted within the recess defined by the flange 16. The lower face of the disk 21 is smooth and preferably flush with the bottom surface of the flange 16.

The lower face 22 of the head 15 is convex or slightly tapered inwardly and downwardly so that the central portion is somewhat lower than the portion adjacent the flange 16. Accordingly, the sealing disk 21, which is of equal thickness throughout, presents a slightly convexed lower surface as clearly shown in Fig. 4 wherein the cap 11 is perfectly flat. The disk 21 is provided with a central opening 23 in register with the opening 20, the walls of the opening 23 being preferably flared as shown. This construction serves as a vacuum cup or bell during the testing operation as hereinafter described. The head 15 is provided with a series of openings 24 extending therethrough at intermediate points between the center opening and the periphery of the sealing disk, and preferably uniformly spaced from the center opening.

A line or confined passageway through which air is drawn, herein referred to as a vacuum line, extends to the testing head. It includes a flexible pipe 25 having a connection 26 at one end with the tubular handle 18 and at its opposite end with a vacuum operated device or gauge 27. The latter comprises a base 28 and a bellows 29 attached thereto. The head 30 of the bellows is in the form of a disk to which is attached a guide rod 31 extending downwardly within a central bore 32. The latter is formed in the base 28 and extends through a guide post 33 formed integral with the base 28. The bore 32 opens into the vacuum line which extends from the base 28 through a pipe 34 and a valve 35 to a source of vacuum or reduced air pressures (not shown). A series of branch openings 36 extend from the opening 32 to the interior of the bellows.

A coil spring 37 surrounding the post 33 and held under compression between the base 28 and the head 30, holds the bellows in the extended position as shown, while atmospheric pressure is maintained within the bellows. The upward movement of the head 30 is limited by an adjustable stop 38 mounted in a bracket 39. An electrical contact lever 40 pivoted at 41, has a connection 42 with the head 30. The free end of the lever carries an adjustable contact screw 43 adapted to actuate a switch 44 in the electrical circuit of a signal lamp 45.

The testing head 15 when lowered onto a jar 10 is centered thereon by means of corner extensions 46 formed on the head and adapted to project downwardly over the cap flange 13, the inner faces 47 of the corners being tapered to facilitate guiding and centering of the testing head on the jar.

The operation is as follows:

The testing head is seated on the jar to be tested as shown in Figs. 1, 3 and 4. Suction is then applied through the vacuum line. If there is no vacuum within the jar so that the cap 11 is flat as shown in Fig. 4, the seating of the testing head thereon forms a seal between the cap 11 and the sealing disk 21. This seal surrounds the center opening 23. The exhaustion of the air from the vacuum line then produces a degree of vacuum within the bellows sufficient to cause the head 30 to be lowered against the upward pressure of the spring 37 and thereby operates the contact lever 40 and closes the switch 44. This lights the signal lamp 45 and indicates that the jar under test is defective.

If there is a good degree of vacuum within the jar as indicated in Fig. 3, then when the air is drawn through the vacuum line there is an inflow of air through the openings 24 (Fig. 3) and the passageway between the cap 11 and sealing disk into the vacuum line as indicated by the arrows. This prevents a sufficiently high degree of vacuum from being built up in the bellows to operate the switch, so that the signal lamp remains dark, thus indicating a sufficient vacuum within the jar under test.

Owing to the convexity of the sealing surface of the disk 21, the cap 11 may be drawn downward to a certain degree under a low vacuum without preventing a seal being effected between the cap and the sealing disk, so that the signal lamp will be lighted. The apparatus is thus adapted to detect all jars in which the vacuum is below the required standard. The degree of vacuum necessary to meet the test may be varied by adjusting the degree of compression of the spring 37, by varying the degree of taper or convexity of the sealing disk 21, by varying the amount of air drawn through the vacuum line or by a combination of such adjusting means.

The invention as herein illustrated and above described is particularly adapted for testing vacuumized containers, but it will be understood that the same principle of operation may be employed for testing sealed containers in which super-atmospheric pressure is maintained. In this instance the caps would be bulged outwardly and the contacting surface of the sealing gasket 21 could be made somewhat concave rather than convex. Then when the testing head is applied it will form a seal with the container cap, providing there is the required pressure within the container. This would cause the signal lamp to be lighted, which in this instance would indicate a sufficient pressure in the container. With a reduced pressure the cap would be flattened out or its convexity reduced, thereby preventing the testing head from making a seal with the cap. The lamp would then remain dark, indicating too low a pressure within the container.

The apparatus may be adapted for operation by means of air pressure applied through the line instead of vacuum. In this adaptation the coil spring 37 within the bellows is preferably placed under tension by which the bellows is collapsed while atmospheric pressure is maintained therein. The electrical switch 44 may also be opened in this instance by the contact 43 while the bellows is collapsed, and closed when the contact 43 is withdrawn by the expansion of the bellows. When a testing head is applied to a container such as shown in Fig. 4, a seal is formed by the disk 21. Then when air pressure is applied to the line a pressure is built up within the bellows sufficient to expand it and cause the signal lamp to be lighted. This will indicate that the container under test lacks the required degree of vacuum. If the test is made with a properly vacuumized container, such as shown in Fig. 3, the air applied to the line can escape through the openings 24 thus preventing sufficient air pressure being built up within the bellows to expand it. Accordingly, the lamp will remain unlighted, thus indicating a sufficient vacuum within the jar under test.

Fig. 5 illustrates a modification in which a battery of testing heads 15 are adapted for simultaneously testing a plurality of jars while the latter are packed in a shipping carton 50. The testing heads are mounted in an arm 51 which is movable downwardly to seat the heads on a row of jars. The heads are individually movable up and down relative to the arm, and springs 52 are provided to hold the said heads seated on the jars, allowing them to adjust themselves to the jars. The heads are squared as indicated to permit them to seat on the jars without interference with the walls or partitions of the carton. The vacuum line includes a pipe 53 which communicates with the several bellows 27, permitting the entire row of jars to be tested in a single operation.

Modifications may be resorted to within the spirit and scope of my invention.

I claim:

1. Apparatus for testing the pressure condition within containers that are sealed under a partial vacuum with at least a portion of the enclosures forming the containers being deformable under the action of the partial vacuum, said apparatus comprising a testing head having a concave bottom surface, a sealing disk secured to and covering said surface, the lower face of said disk forming a sealing surface adapted to seat on a said container, said head and disk having a central opening therethrough and laterally-spaced openings therethrough intermediate the central opening and periphery of said head, and arranged to permit the passage of air between said laterally-spaced and central openings when said head is seated on the container with the said sealing surface spaced from the underlying surface of the container.

2. Apparatus for testing the pressure condition within containers that are sealed under a partial vacuum with at least a portion of the enclosures forming the containers being deformable under the action of the partial vacuum, said apparatus comprising a testing head having a concave bottom surface, a sealing disk secured to and covering said surface, the lower face of said disk forming a sealing surface adapted to seat on a said container, said head and disk having a central opening therethrough and laterally-spaced openings therethrough intermediate the central opening and periphery of said head, and arranged to permit the passage of air between said laterally-spaced and central openings when said head is seated on the container with the sealing surface spaced from the underlying surface of the container, a pipe line connected to said head and communicating with said central opening, and a bellows connected in said pipe line.

3. Apparatus for testing the pressure condition within containers that are sealed under a partial vacuum with at least a portion of the enclosures forming the containers being deformable under the action of the partial vacuum, said apparatus comprising a testing head having a concave bottom surface, a sealing disk secured to and covering said surface, the lower face of said disk forming a sealing surface adapted to seat on a said container, said head and disk having a central opening therethrough and laterally-spaced openings therethrough intermediate the central opening and periphery of said head, and arranged to permit the passage of air between said laterally-spaced and central openings when said head is seated on the container with the said sealing surface spaced from the underlying surface of the container, a pipe line connected to said head and communicating with said central opening, and a bellows connected in said pipe line, a signal device, and means actuated by the bellows for operating the signal device.

4. Apparatus for testing the pressure condition within a container that is sealed under a partial vacuum, the enclosure forming the container having a portion presenting a flat exterior surface deformable under the action of the partial vacuum and deflected to an extent determined by the pressure condition within the container, said apparatus comprising a testing head having an annular surface adapted to seat on said flat surface of the container, said head including a disk of rubber-like sealing material having an outer face forming an interior extension of said annular surface, said face of the disk being convex, said head being formed with a central opening extending therethrough and laterally-spaced openings extending therethrough intermediate said central opening and the periphery of the head, said disk being adapted to make sealing contact with the said flat surface of the container when the testing head is seated and said flat surface is not deformed and thereby provide a seal between said central and laterally-spaced openings.

5. Apparatus for determining the pressure conditions within a sealed container, at least a portion of the enclosure forming the container being deformable under a pressure differential between the interior and exterior of the container, which apparatus comprises a testing head adapted to seat on a surface of the container, said head comprising a sealing disk having a sealing surface and formed with a main passageway extending from said sealing surface through said head, and auxiliary passageways spaced from said main passageway and extending from said sealing surface through said head, means providing a vacuum line extending to and including said main passageway, said auxiliary passageways being positioned and arranged to provide communication between said main and auxiliary passageways when said head is seated on said deformable portion of the container with the surface of said deformable portion held spaced from the said surface of the sealing disk by pressure conditions within the container, and pressure responsive means in communication with said main passageway.

6. Apparatus for determining the pressure conditions within a sealed container, at least a portion of the enclosure forming the container being deformable under a pressure differential between the interior and exterior of the container, which apparatus comprises a testing head adapted to seat on a surface of the container, said head comprising a sealing disk having a sealing surface and formed with a main passageway extending from said sealing surface through said head, and auxiliary passageways spaced from said main passageway and extending from said sealing surface through said head, means providing a vacuum line extending to and including said main passageway, said auxiliary passageways being positioned and arranged to provide communication between said main and auxiliary passageways when said head is seated on said deformable portion of the container with the surface of said deformable portion held spaced from the said surface of the sealing disk by pressure conditions within the container, and pressure responsive means including a bellows communicating with said main passageway, and a signal device actuated by said bellows.

7. Apparatus for determining the pressure conditions within a sealed container, at least a portion of the enclosure forming the container being deformable under a pressure differential between the interior and exterior of the container, which apparatus comprises a testing head adapted to seat on a surface of the container, said head comprising a sealing disk having a sealing surface and formed with a main passageway extending from said sealing surface through said head, and auxiliary passageways spaced from said main passageway and extending from said sealing surface through said head, means providing a vacuum line extending to and including said main passageway, said auxiliary passageways being positioned and arranged to provide communication between said main and auxiliary passageways when said head is seated on said deformable portion of the container with the surface of said deformable portion held spaced from the said surface of the sealing disk by pressure conditions within the container, pressure responsive means including a bellows communicating with said main passageway, a signal lamp, and means actuated by said bellows for establishing an electrical circuit for said lamp.

8. Testing apparatus for testing the pressure condition within containers that are sealed under a partial vacuum with at least a portion of the enclosures forming the containers being deformable under the action of the partial vacuum, said apparatus comprising a testing head having an annular surface for seating on a container to be tested with the testing head over the said deformable portion of the container, said head having an approximately flat sealing surface within the area circumscribed by said annular surface, said head being formed with a central opening therethrough and a laterally-spaced opening therethrough intermediate said central opening and said annular surface, said sealing surface being arranged and positioned to make sealing contact with said deformable portion and thereby cut off communication between said openings when the testing head is seated on the container and the latter is not under a sufficient vacuum to deform said deformable portion.

9. Testing apparatus for testing the pressure condition within containers that are sealed under a partial vacuum with a closure device having a flat surface deformable under the action of a partial vacuum, said apparatus comprising a testing head having an annular surface adapted to seat on the rim of a sealed container to be tested, with the testing head over said deformable surface, said head including a disk of rubber-like sealing material having an outer face forming an interior extension of said annular surface, said head and disk having an opening extending centrally therethrough and an opening intermediate the central opening and said annular surface extending through said head and disk, said face of the disk being convex and adapted to make sealing contact with said flat surface and thereby seal said central opening when the head is seated on the container and the latter is not under sufficient vacuum to deform said flat surface.

JOHN HOHL.